(12) United States Patent
Yang et al.

(10) Patent No.: US 8,611,968 B2
(45) Date of Patent: Dec. 17, 2013

(54) METHOD AND MOBILE TERMINAL FOR PROCESSING CONTACTS

(71) Applicant: Huawei Device Co., Ltd., Shenzhen (CN)

(72) Inventors: Yuanyuan Yang, Shenzhen (CN); Junjie Deng, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/720,444

(22) Filed: Dec. 19, 2012

(65) Prior Publication Data

US 2013/0109363 A1  May 2, 2013

Related U.S. Application Data

(63) Continuation of application No. PCT/CN2010/080401, filed on Dec. 28, 2010.

(51) Int. Cl.
*H04M 1/00* (2006.01)

(52) U.S. Cl.
USPC .............. 455/566; 455/414.1; 455/414.2

(58) Field of Classification Search
USPC .................. 455/414.1, 414.2, 56, 414.26
See application file for complete search history.

(56) References Cited

U.S. PATENT DOCUMENTS

| | | |
|---|---|---|
| 2004/0017376 A1 | 1/2004 | Tagliabue et al. |
| 2007/0118809 A1 | 5/2007 | Ozugur et al. |
| 2008/0276197 A1 | 11/2008 | Diederiks et al. |
| 2009/0007016 A1 | 1/2009 | Lindberg et al. |
| 2009/0037477 A1 | 2/2009 | Choi et al. |
| 2009/0227296 A1 | 9/2009 | Kim |
| 2010/0062753 A1 | 3/2010 | Wen et al. |
| 2010/0146433 A1 | 6/2010 | Murata et al. |
| 2010/0203904 A1 | 8/2010 | Khokhlov |

FOREIGN PATENT DOCUMENTS

| | | |
|---|---|---|
| CN | 1967540 A | 5/2007 |
| CN | 101322376 A | 12/2008 |
| CN | 101359334 A | 2/2009 |
| CN | 101546247 A | 9/2009 |
| CN | 101599917 A | 12/2009 |
| CN | 101600017 A | 12/2009 |
| CN | 101751220 A | 6/2010 |
| CN | 101820463 A | 9/2010 |
| JP | 2007328456 A | 12/2007 |

(Continued)

OTHER PUBLICATIONS

International Search Report issued in corresponding PCT Application No. PCT/CN2010/080401 (including English Translation); mailed Oct. 13, 2011.

(Continued)

*Primary Examiner* — Temica M Beamer
(74) *Attorney, Agent, or Firm* — Brinks Gilson & Lione

(57) ABSTRACT

A method for processing contacts in a mobile terminal according to embodiments of the present invention includes: setting a mapping relationship between different values of distinctive attributes of contacts and display effects of contact icons; reading contacts; obtaining distinctive attributes of contacts locally or from a network side; determining display effects of contact icons according to the mapping relationship and the distinctive attributes; and displaying the contacts distinctively according to the determined display effects. According to the processing method and mobile terminal provided in embodiments of the present invention, different contacts can be displayed intuitively in the mobile terminal, which enhances the capability of intelligent interaction between the mobile terminal and the user greatly.

10 Claims, 15 Drawing Sheets

(56) References Cited

FOREIGN PATENT DOCUMENTS

| | | |
|---|---|---|
| JP | 2009-217816 A | 9/2009 |
| JP | 2010134802 A | 6/2010 |
| TW | 201017461 A | 5/2010 |
| WO | 2007/063499 A1 | 6/2007 |

OTHER PUBLICATIONS

European Search Report issued in corresponding European Patent Application No. 1.0860889.4; dated Oct. 19, 2012.
Office Action issued in corresponding European Patent Application No. 10860889.4, mailed Aug. 22, 2013, 6 pages.
Office Action issued in corresponding Japanese Patent Application No. 2012-550304, mailed Sep. 24, 2013, 3 pages.

METHOD AND MOBILE TERMINAL FOR PROCESSING CONTACTS

CROSS-REFERENCE TO RELATED APPLICATIONS

This application is a continuation of International Application No. PCT/CN2010/080401, filed on Dec. 28, 2010, titled "METHOD AND MOBILE TERMINAL FOR PROCESSING CONTACTS," the entire content of which is incorporated herein by reference.

TECHNICAL FIELD

The present disclosure relates to the field of data processing technologies, and in particular, to a method and mobile terminal for processing contacts in a mobile terminal.

BACKGROUND

Mobile terminal (for example, a mobile phone or a tablet computer) is an indispensable communication tool in people's work and life. People can store information in the mobile terminal, for example, people can store contact information (such as mobile phone numbers or Email addresses) of friends and colleagues in a contact application of the mobile phone according to a preset format. The contact application is a program storing specific contact information (such as names, portraits, or mobile phone numbers) of contacts according to a preset format. A contact application interface is an interface that is displayed on the touch screen of a mobile phone after the contact application receives a command entered by a user. In the prior art, the following modes are available for processing contacts on the contact application interface: As shown in FIG. 1, on the contact application interface, contacts are displayed in name mode, and are arranged in rows simply according to the initial letters or the stroke numbers of names; as shown in FIG. 2, contacts are displayed in portrait and name mode, and are arranged simply to form a 9-block vision, a 12-block vision, and so on.

However, the modes for processing contacts by the mobile terminal in the prior art cannot reflect different contacts in an intuitive manner, which reduces the capability of intelligent interaction between the mobile terminal and the user.

SUMMARY

An embodiment of the present invention provides a method for processing contacts in a mobile terminal having a processor. The processor sets a mapping relationship between different values of distinctive attributes of contacts and display effects of contact icons. The processor reads contacts and obtains distinctive attributes of contacts locally or from a network side; determining display effects of contact icons according to the mapping relationship and the distinctive attributes. The terminal then displays the contacts distinctively according to the determined display effects.

In addition, another embodiment of the present invention provides a mobile terminal including a radio frequency transceiving antenna, a communication module, and a central processing unit. The mobile terminal further includes a contact processing apparatus which includes: a storing module, configured to store contacts; a setting module, configured to set a mapping relationship between different values of distinctive attributes of contacts and display effects of contact icons; a distinctive attribute module, configured to obtain distinctive attributes of contacts; a determining module, configured to determine display effects of contact icons according to the mapping relationship; and a displaying module, configured to display the contacts distinctively according to the determined display effects.

According to the processing method and mobile terminal provided in the embodiments of the present invention, different contacts can be displayed intuitively in a mobile terminal, which enhances the capability of intelligent interaction between the mobile terminal and a user.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE EMBODIMENTS

In order to make the objectives, technical solutions and advantages of the present invention clearer, the present invention is hereinafter described in detail with reference to the accompanying drawings and embodiments. The exemplary embodiments and descriptions of the embodiments of the present invention are used to illustrate the present invention, but the present invention is not limited thereto.

Embodiment 1

Figure 3:
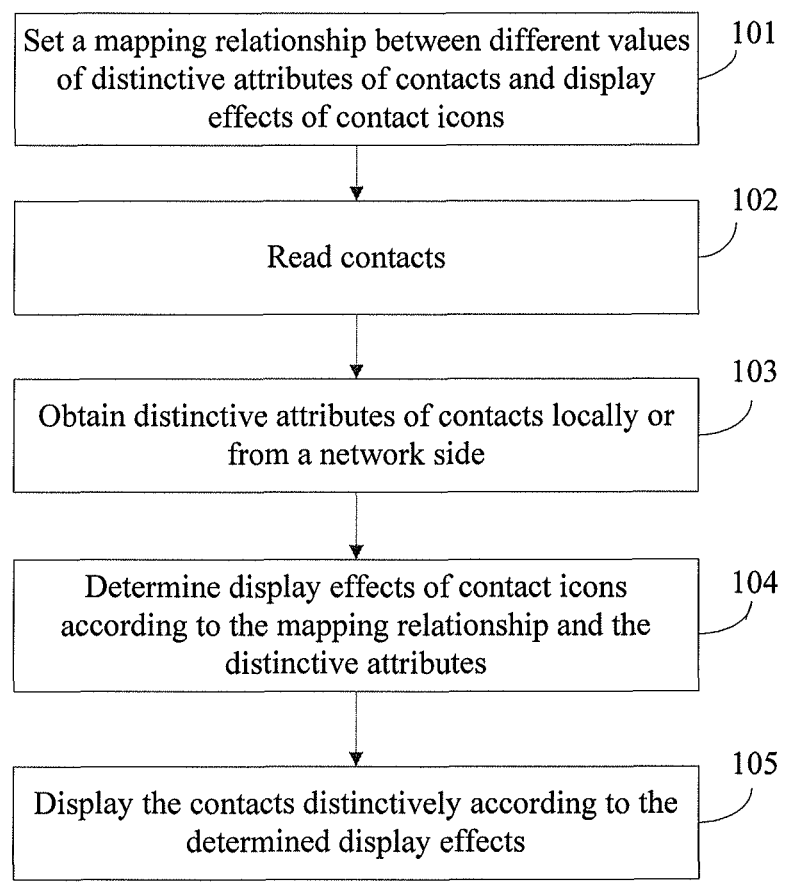
FIG. 3 is a flowchart of a method according to Embodiment 1 of the present invention.

Embodiment 1 of the present invention provides a method for processing contacts. As shown in FIG. 3, the method includes:

Step 101: Set a mapping relationship between different values of distinctive attributes of contacts and display effects of contact icons. The distinctive attributes are specific attributes based on which contacts can be distinctively displayed on a touch screen. For example, the distinctive attributes may be group attributes of contacts, the group attributes are contact group information set by a user for contacts. The distinctive attribute also may be contact attributes of contacts, the contact attributes are times of communication between a mobile terminal user and contacts in a preset time. The distinctive attributes also may be location attributes of contacts, the location attributes include geographical location information of contacts. The contact icon refers to the icon of contacts displayed on the touch screen. In the embodiment of the present invention, the contact icons may be in the form of a contact bubble. The contact bubble is a display effect of the contact icon displayed on the touch screen of the mobile terminal in the embodiment of the present invention. Definitely, it is understandable that in other embodiments, the contact icon may also be in the form of a contact block, or may be in other forms that can be displayed.

Step 102: Read contacts; and specifically, read contacts from a local memory of the mobile terminal or a server on a network side.

Step 103: Obtain distinctive attributes of the contacts locally or from the network side. After reading the contacts, specific information about the contacts including the distinctive attributes of the contacts can be obtained.

Step 104: Determine display effects of the contact icons according to the mapping relationship and the distinctive attributes.

Step 105: Display the contacts distinctively according to the determined display effects.

The mapping relationship between different values of distinctive attributes of contacts and display effects of contact icons is specifically a mapping relationship between contacts with distinctive attributes of different values and display effects of icons. For example, specifically, the mapping relationship may be a mapping relationship between different values of contact attributes of contacts and display effects of contact bubbles, or may be a mapping relationship between different values of group attributes of contacts and display effects of contact bubbles, or may be a mapping relationship between different values of location attributes of contacts and display effects of contact icons, and so on. A distinctive display refers to that contacts with distinctive attributes of different values are displayed according to the mapping relationship by using different display effects.

The above solution is different from the display mode (contact list) of contacts in the prior art, and displays the contacts more intuitively on the touch screen, to enhance the capability of man-machine interaction of the mobile terminal having a touch screen, and also improves the user experience. The specific technical solution of the first embodiment of the present invention is hereinafter described in detail with reference to specific embodiments.

Embodiment 2

Figure 4:
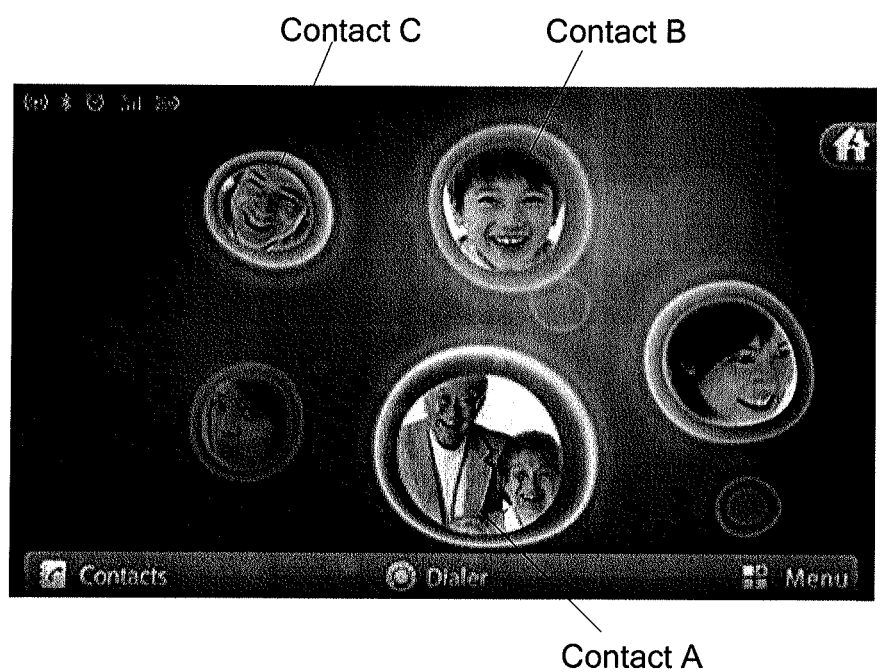
FIG. 4 is a display effect diagram of a contact application interface of a mobile terminal according to Embodiment 2 of the present invention.

FIG. 4 is one instance of a display effect diagram of a contact application interface of a mobile terminal according to an embodiment of the present invention. In FIG. 4, contact icons are set to be in the form of circle-like bubbles, all contacts are displayed in the form of circle-like bubbles on a touch screen. The bubbles are referred to as contact bubbles. Contact portraits are displayed in the contact bubbles. Contact information of contacts, such as names and mobile phone numbers, may be displayed in the contact bubbles. Contact portraits and specific contact information may also be displayed in the bubbles together (namely, picture and text display). It is understandable that in other embodiments, contact icons may also be in other forms, for example, in the form of a star, a square, or a polyhedron. The embodiment does not limit the display mode of contacts. The above solution is different from the display mode (contact list) of contacts in the prior art, and displays the contacts more intuitively on a touch screen, to enhance the capability of man-machine interaction of a mobile terminal having a touch screen.

Figure 5:
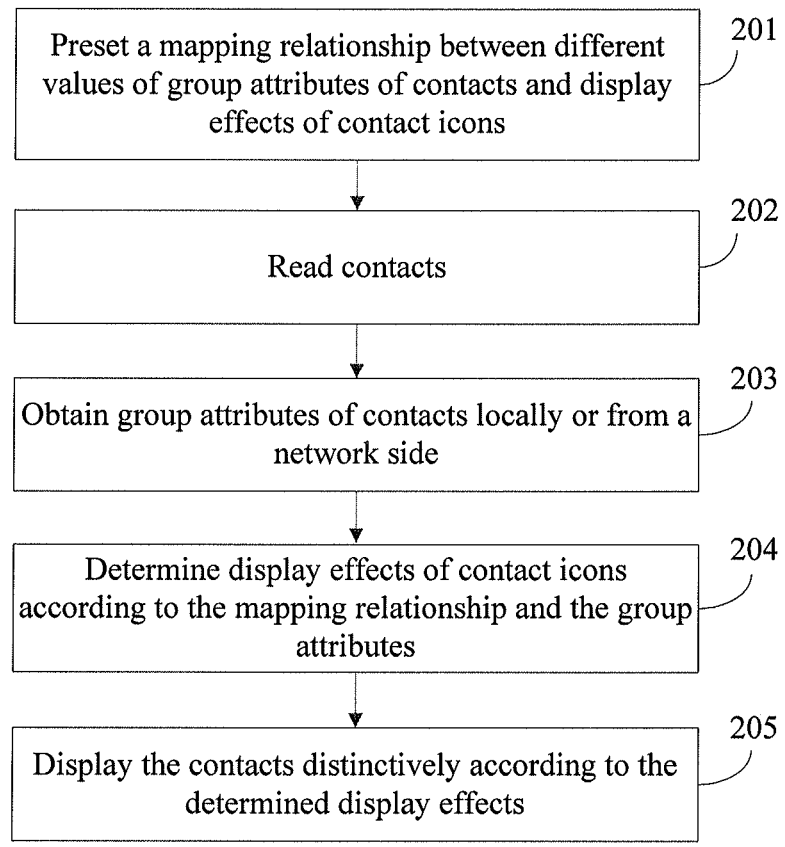
FIG. 5 is a flowchart of a method according to the Embodiment 2 of the present invention.

In FIG. 4, different contacts may be displayed in different forms of contact bubbles. For example, a mobile terminal user sets different values for the group attributes of the contacts, for example, the value of the group attribute of contact A is family (i.e., the contact A belongs to group family), and the value of the group attribute of contact B is friend (i.e., the contact B belongs to group friend). Different groups are displayed in different bubbles. For example, because the value of the group attribute of contact A is family, and the value of the group attribute of contact B is friend, the bubble of contact A is bigger than that of contact B, or the bubble of contact A is brighter or displayed at a more noticeable position on the touch screen, or the bubble of contact A is displayed dynamically while the bubble of contact B is displayed not dynamically, and so on. Other display modes for contact A and contact B may also be included in this embodiment. FIG. 5 illustrates a method according to the embodiment of the present invention:

Step 201: Preset a mapping relationship between different values of the group attributes of the contacts and display effects of the contact icons. A group attribute includes contact group information set for the contacts, for example, the group attribute may be family, friend, colleague, or the like. Specifically, the display policy is set to display contact icons distinctively according to different values of the group attributes of the contacts. For example, the display policy may determine that the contacts whose group attributes are family are displayed in the bigger bubbles than the contacts of other group attributes (friends, colleagues, and so on), or the display policy may determine that the contacts whose group attributes are family are displayed more clearly than contacts of other group attributes. It is understandable that the display policy in the embodiment of the present invention includes but is not limited to the above forms.

Step 202: Read contacts.

Figure 1:
FIG. 1 is a schematic diagram of mode 1 for processing contacts in the prior art.
Figure 2:
FIG. 2 is a schematic diagram of mode 2 for processing contacts in the prior art.

Step 203: Obtain group attributes of the contacts locally or from a network side. When a mobile terminal (such as a mobile phone) receives, from a user, a command for displaying a contact application interface, the mobile phone confirms the group attributes of the contacts. The contact application interface is an interface that is displayed on the touch screen of the mobile phone after a contact application receives a command entered by a user. For example, in a Nokia mobile phone, the contact application is named as a business card, a contact, a phonebook, and so on. The user can see a contact application interface after starting the contact application. FIG. 1 shows a contact application interface of a mobile terminal in the prior art, and FIG. 4 shows a contact application interface in the embodiment of the present invention.

Step 204: Determine display effects of contact icons according to the mapping relationship and the group attributes. The display effects may be determined according to the above mapping relationship and the group attributes.

Step 205: Display the contacts distinctively according to the determined display effects.

For example, the user sets different values of group attributes of the contacts, for example, the value of the group attribute of contact A is family, and the value of the group attribute of contact B is friend. Different contact groups are displayed in different bubbles. For example, because the value of the group attribute of contact A is family, and the value of the group attribute of contact B is friend, the displayed bubble of contact A is bigger than that of contact B, or the bubble of contact A is displayed in a brighter color or displayed at a more noticeable position on a touch screen, or the bubble of contact A is displayed dynamically while the bubble of contact B is displayed not dynamically, and so on. Other display modes for displaying contact A and contact B may also be included in this embodiment.

The above solution is different from the display mode (contact list) of contacts in the prior art, and displays the contacts more intuitively on the touch screen so as to enhance the capability of man-machine interactions of the mobile terminal having a touch screen and also improve the use experience.

Embodiment 3

Figure 6:
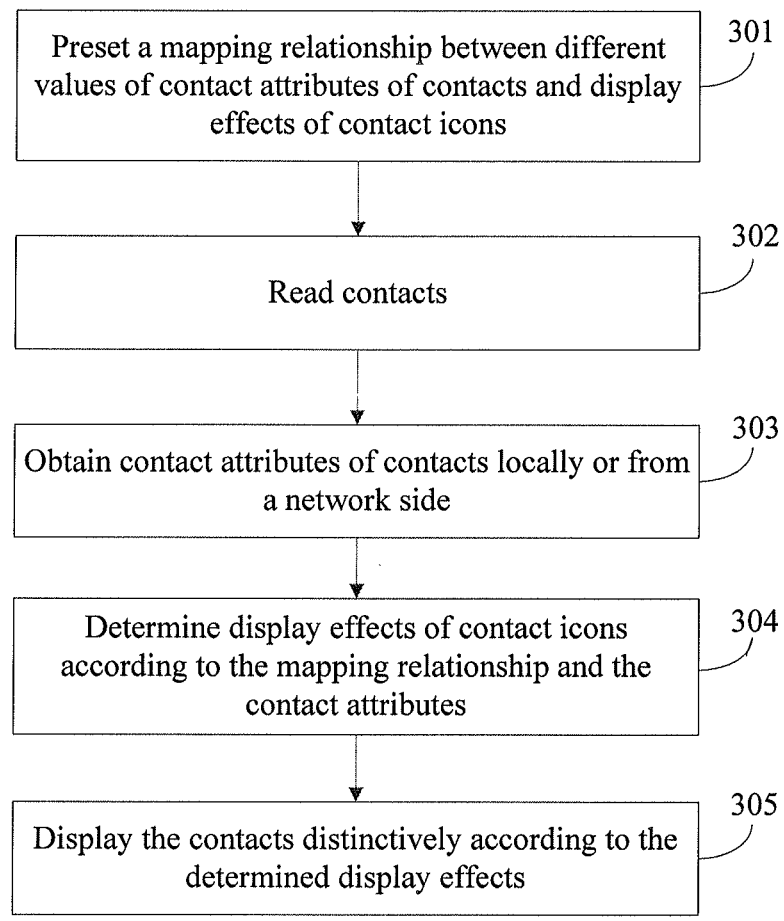
FIG. 6 is a flowchart of a method according to Embodiment 3 of the present invention.

In the embodiment of the present invention, display effects of contact bubbles vary according to contact attributes of contacts. The contact attribute refers to times of communication (including phone dialing, short message sending, and email) between the user and a contact within a preset time. For example, the contact attribute of contact A is 10, the contact attribute of contact B is 7, and the contact attribute of contact C is 5. Therefore, the display effects of the three contact bubbles may be the display sizes of the contact bubbles. According to the above statistics of contact attributes, the display sizes of the contact bubbles are arranged as follows in descending order: contact A, contact B, and contact C; or the display brightness of the contact bubbles is arranged as follows from high to low: contact A, contact B, and contact C; or the dynamic display effects of the contact bubbles are arranged as follows from strong to weak: contact A, contact B, and contact C; or contact A is displayed at the most noticeable position on the touch screen, contact B is displayed at a less noticeable position, and contact C is displayed at the least noticeable position; or other presentation forms may be used. It is understandable that in the embodiment of the present invention, different presentation forms used for the contacts having different contact attributes include but are not limited to the above solution. A technical solution based on which the display effects of contact bubbles vary according to different contact attributes of contacts is shown in FIG. 6. The specific technical solution is implemented as follows:

Step 301: Preset a mapping relationship between different values of the contact attributes of the contacts and the display effects of contact icons.

Step 302: Read contacts.

Step 303: Obtain the contact attributes of the contacts locally or from a network side. The contact attribute refers to times of communication (including phone dialing, short message sending, and email) between a mobile terminal user and the contacts within a preset time. When a command (such as a call command and a short message sending command) of the user for triggering communication with a contact is obtained, or an answer command of the user is obtained when the contact communicates with the user actively, a counter adds 1 to the contact attribute record of the contact. The counter accumulates the times of communication between the user and the contact.

Step 304: Determine the display effects of contact icons according to the mapping relationship and the contact attributes.

Step 305: Display the contacts distinctively according to the determined display effects.

For example, for a contact having the highest contact attribute, the biggest contact bubble is displayed, or a contact bubble having the most noticeable dynamic effect is displayed, or a contact bubble which is brightest is displayed. For a contact having a higher contact attribute, a bigger contact bubble is displayed, or a contact bubble having a more noticeable dynamic effect is displayed, or a contact bubble which is brighter is displayed. For a contact having the lowest contact attribute, a smallest contact bubble is displayed, or a contact bubble having no dynamic effect is displayed, or a contact bubble which is darkest is displayed. Distinctive display refers to that the display effects of the contact icons for the contacts vary according to different values of the contact attributes. For example, as shown in FIG. 4, the contact attribute of contact A is 10, the contact attribute of contact B is 7, and the contact attribute of contact C is 5, therefore, the presentation forms of the three contacts may be the display sizes of the contact bubbles. According to the above statistics of the contact attributes, the display sizes of the contact bubbles are arranged as follows in descending order: contact A, contact B, and contact C; or the display brightness of the contact bubbles is arranged as follows from high to low: contact A, contact B, and contact C; or the dynamic display effects of the contact bubbles are arranged as follows from strong to weak: contact A, contact B, and contact C; or contact A is displayed at the most noticeable position on a touch screen, contact B is displayed at a less noticeable position, and contact C is displayed at the least noticeable position; or other presentation forms may be used.

The above solution is different from the display mode (contact list) of contacts in the prior art, and displays the contacts more intuitively on the touch screen, to enhance the capability of man-machine interaction of a mobile terminal having a touch screen and also improve the use experience.

Embodiment 4

Figure 7:
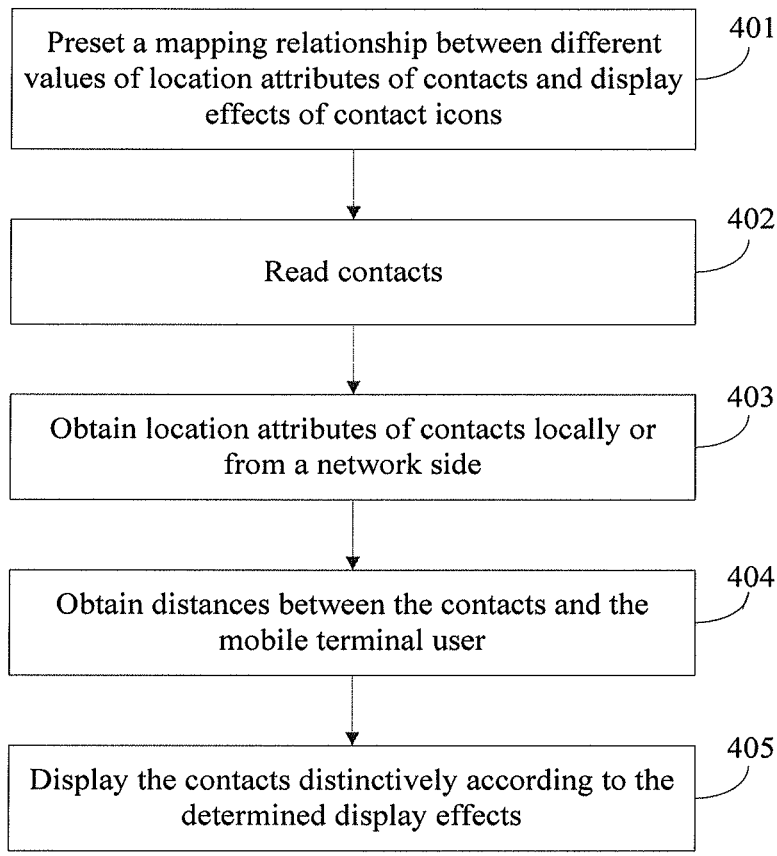
FIG. 7 is a flowchart of a method according to Embodiment 4 of the present invention.

In the embodiment of the present invention, display effects of contact bubbles vary according to distances between geographical locations of contacts and a geographical location of the user. For example, among all contacts, the geographical location of contact A is nearest to the geographical location of the user, and therefore the displayed contact bubble of contact A is biggest or clearest; the geographical location of contact B is farthest from the geographical location of the user, and therefore the displayed contact bubble of contact B is smallest or vaguest, or other solutions may be used. As shown in FIG. 7, the above technical solution is implemented as follows:

Step 401: Set a mapping relationship between different values of location attributes of contacts and display effects of contact icons.

Step 402: Read contacts.

Step 403: Obtain the location attributes of the contacts locally or from a network side. The location attributes are geographical location information of contacts. In This step is to obtain geographical location information of a mobile terminal user and geographical location information of contacts in a mobile terminal. In the field of technologies, the geographical location information refers to geographical data provided according to a global positioning system (Global Positioning System, GPS) or other geographical location services, and indicates the current physical location of the mobile terminal. For example, in the embodiment of the present invention, the mobile terminal may be a mobile phone with a GPS transceiving module, and therefore, the mobile phone may obtain its own geographical location information according to the geographical data provided by the GPS system. Contacts are stored in the mobile phone. The mobile phone sends a request message for querying geographical location information of contacts to a network-side geographical location server; after receiving the request message, the network-side geographical location server obtains the geographical location information of contacts registered with the server and feeds back the information to the mobile phone. In other embodiments, contacts may also actively share their respective geographical location information with their own contacts and friends in real time through third-party location service software. Therefore, all contacts or friends share geographical location information of each other. For example, a mobile terminal user who logs in to a Google map service may share the geographical location information of the user with its own contacts or friends.

Step 404: Obtain distances between contacts and the mobile terminal user. Relative linear distances between geographical location information of contacts and geographical location information of the mobile terminal user may be calculated to obtain distances between contacts and the mobile terminal user. For example, a mobile phone obtains geographical location information of contact A, and also obtains the geographical location information of a mobile phone user (namely, the geographical location information of the mobile phone); therefore, the relative linear distances may be obtained through simple calculation, and the relative linear distances may be used as distances between contacts and the mobile terminal user.

Step 405: Display the contacts distinctively according to the determined display effects.

For example, among all contacts, the geographical location of contact A is nearest to the geographical location of a user, and therefore the displayed contact bubble of contact A is biggest or clearest; the geographical location of contact B is farthest from the geographical location of the user, and therefore the contact bubble of contact B displayed on a screen is smallest or vaguest. Definitely, in the embodiment of the present invention, the mode for displaying contacts distinctively includes but is not limited to the above modes.

Further, the mobile terminal may obtain the geographical location information of contacts in a phonebook, and therefore, when the above technical solution is executed, contact bubbles displayed on a contact application interface may be updated and adjusted dynamically to provide more intuitive experience for the mobile terminal user. In addition, the user may learn a distance between the user and a contact or friend in the geographical location. For example, when the mobile terminal obtains distances between contacts and the mobile terminal user again, obtained data may be different from data obtained at a last time. In this way, when contacts are displayed distinctively according to the obtained distances and a preset display policy again, contact display on a contact application interface is different from last display. Therefore, the contact display mode of a display interface may be different each time when a mobile phone user opens the contact application interface, thereby reaching an effect of dynamically updating the contact application interface and providing more intuitive experience for the user.

Embodiment 5

Figure 8:
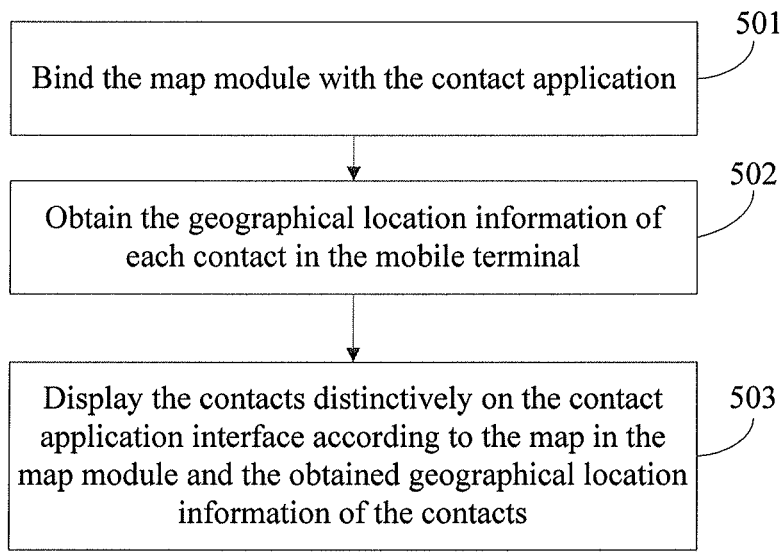
FIG. 8 is a flowchart of a method according to Embodiment 5 of the present invention.

In the embodiment of the present invention, display effects of contact bubbles may vary according to different geographical location information of contacts. For example, the geographical location information of contact A is Shanghai, the geographical location information of contact B is Shenzhen, the geographical location information of contact C is Beijing, and the geographical location information of contact D is Xi'an. Therefore, during display of a contact application interface, the background of the display is a China map, and the display positions of contact bubbles on a touch screen are consistent with geographical locations marked on the map. Besides, contacts may be further displayed distinctively according to distances between geographical locations of contacts and a geographical location of a mobile phone user. As shown in FIG. 8, the above technical solution may be specifically implemented as follows:

Step 501: Bind a map module with a contact application. The map module may be a location service module for marking geographical locations. After geographical locations are marked in the map module, map location information is generated. Specifically, the map location information may be name information of cities such as Beijing, Shanghai, and Shenzhen, or may be name information of provincial units such as Hubei province, Guangdong province, and Guangxi province. The map module may be a hardware device, or may implement the relevant marking function of a map through only software, for example, a map widget, which may be a visualized China map or a global map. After the binding, when a mobile terminal receives a command for opening a contact application interface from the user and opens the contact application interface, a map module application interface is displayed on the application interface accordingly, and may be displayed on the contact application interface as a background program.

Step 502: Obtain the geographical location information of each contact in the mobile terminal. The geographical location information refers to geographical data provided according to a global positioning system (Global Positioning System, GPS) or other geographical location services, and indicates the current physical location of the mobile terminal. For example, in the embodiment of the present invention, the mobile terminal may be a mobile phone with a GPS transceiving module, and therefore, the mobile phone may obtain its own geographical location information according to the geographical data provided by the GPS system. Contacts are stored in a mobile phone. The mobile phone sends a request message for querying geographical location information of contacts to a network-side geographical location server; after receiving the request message, the network-side geographical location server obtains the geographical location information of the contacts registered with the server and feeds back the information to the mobile phone. In other embodiments, the contacts may also actively share their respective geographical location information with their own contacts and friends in real time through third-party location service software. Therefore, all contacts or friends share the geographical location information of each other. For example, a mobile terminal user who logs in to a Google map service may share the geographical location information of the user with its own contacts or friends.

Figure 9:
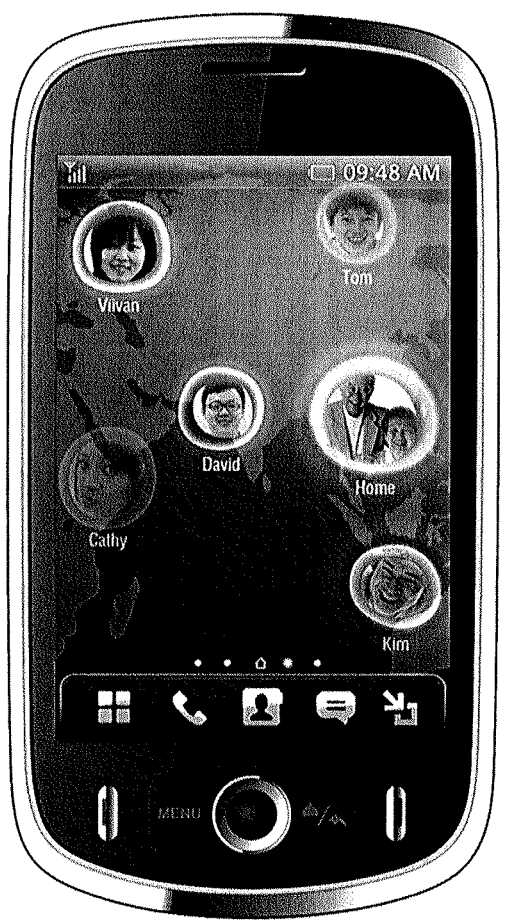
FIG. 9 is a display effect diagram of contacts according to the Embodiment 5 of the present invention.

Step 503: Display the contacts distinctively on the contact application interface according to the map in the map module and the obtained geographical location information of the contacts. For example, the obtained geographical location information of contact A is Shenzhen, and therefore the contact is marked in the map location information of the map module bound with the contact application interface; contacts of different geographical location information are displayed at different positions on the contact application interface, so that the display positions of the contacts are consistent with the map location information in the map module. FIG. 9 is a display effect diagram of contact processing of the method procedure according to an embodiment of the present invention.

Further, in step 502, the geographical location information of a mobile terminal user may also be obtained, and then distances between contacts and a mobile terminal are calculated. Contact bubbles are displayed distinctively according to distances between contacts and the mobile terminal user. For example, among all contacts, the geographical location of contact A is nearest to the geographical location of the user, and therefore the displayed contact bubble of contact A is biggest or clearest; the geographical location of contact B is farthest from the geographical location of the user, and therefore the contact bubble of contact B displayed on the screen is smallest or vaguest, and so on. Then the contacts are displayed distinctively on the contact application interface according to the map location information in the map module and the obtained geographical location information of the contacts. The display modes are described above.

The technical solution in the embodiment of the present invention is different from the display mode (contact list) of contacts in the prior art, and displays the contacts more intuitively on the touch screen, to enhance the capability of man-machine interaction of a mobile terminal having a touch screen and also improve the use experience of the user.

Embodiment 6

In the embodiment of the present invention, two or more types of distinctive attributes of contacts above may be combined to distinctively display contacts more efficiently and intuitively on a contact application interface. For example, when the distinctive attributes include group attributes and contact attributes, setting a mapping relationship between different values of distinctive attributes of contacts and display effects of contact icons includes: setting a mapping relationship between the sum of values of group attributes and contact attributes of contacts and the display effects of contact icons.

When the distinctive attributes include group attributes and location attributes, setting a mapping relationship between different values of distinctive attributes of contacts and display effects of contact icons includes: setting a mapping relationship between the sum of values of group attributes and location attributes of contacts and the display effects of contact icons.

When the distinctive attributes include contact attributes and location attributes, setting a mapping relationship between different values of distinctive attributes of contacts and display effects of contact icons includes: setting a mapping relationship between the sum of values of contact attributes and location attributes of contacts and the display effects of contact icons.

When the distinctive attributes include group attributes, contact attributes, and location attributes, setting a mapping relationship between different values of distinctive attributes of contacts and display effects of contact icons includes: setting a mapping relationship between the sum of values of group attributes, contact attributes, and location attributes of contacts and the display effects of contact icons.

In this way, distinctive contact display is more pertinent, and contacts that are distinctively displayed are also more specific. For example, contact A whose group attribute is marked as family is displayed most clearly, and at the same time, because the geographical location of the contact is nearest to a mobile phone user, the displayed contact bubble of contact A is biggest. Therefore, the contact bubble of contact A is clearest and biggest according to the above display policy.

Embodiment 7

The above embodiments describe contact processing methods. The following embodiment describes how to perform a series of operations (for example, originating a call, editing contact information of contacts, and creating a group) for contacts on the above contact application interface, to facilitate operations of a user and simplify an operation mode.

Figure 10:
FIG. 10 is an effect diagram of calling a contact in the prior art.

In the prior art, as shown in FIG. 10, on a mobile phone having a touch screen, the operation mode of initiating a call to a contact is: finding a corresponding contact according to the initial letter of a name, clicking a "Call" button on a contact interface, and initiating a call to the contact. The operation of an existing call mode is too troublesome, causing operation time to be too long, which is rather unfavorable to intelligent interaction between a mobile phone and a user and greatly decreases the interaction capability of the mobile phone.

Figure 11:
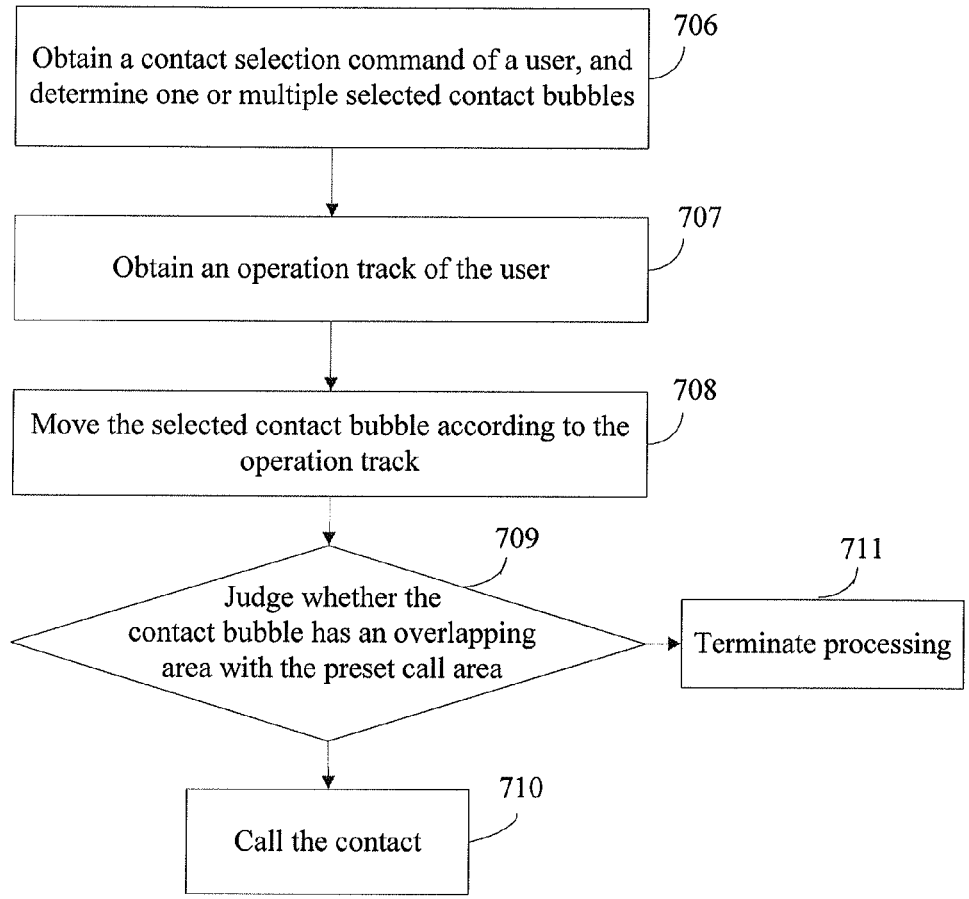
FIG. 11 is a flowchart of a method according to Embodiment 7 of the present invention.

Based on the above contact processing methods in the embodiments of the present invention, as shown in FIG. 11, an embodiment of the present invention provides a processing method for calling contacts.

Step 701: Set a mapping relationship between different values of distinctive attributes of contacts and display effects of contact icons.

Step 702: Read contacts.

Step 703: Obtain distinctive attributes of contacts locally or from a network side.

Step 704: Determine the display effects of contact icons according to the mapping relationship and the distinctive attributes.

Step 705: Display the contacts distinctively according to the determined display effects.

The specific technical solution in the above steps is already detailed in the above embodiments and is not further described here.

Step 706: Obtain a contact selection command of a user, and determine one or multiple selected contact bubbles; in this step, operations of the user are completed on a contact application interface. On a mobile phone, tablet personal computer having a touch screen, operations of the user are generally completed by fingers of the user. In the prior art, the touch screen is formed by a touch sensor component and a touch screen controller. The touch sensor component is installed in the front of a display screen, and is configured to sense a position touched by the user, and send received touch information to the touch screen controller. The main function of the touch screen controller is to receive touch information from the touch sensor, and convert the information into coordinates to send to a central processing unit (CPU) such as a hardware processor. The touch screen controller can also receive and execute a command from the CPU.

In the contact application interface of a two-dimensional display interface, the touch screen is divided into grids with an X direction and a Y direction. All application icon information (such as icon size and icon location) on the touch screen may be indicated by values in the X and Y directions. A location of a contact bubble may also be indicated by values in the X and Y directions. First, the size of a contact bubble may be calculated through junction points between bubble edges and grids, and then the contact bubble is simulated into a square. The size of the contact bubble is also the size of the square. According to calculation of the square size, location information (X1, Y1) of the center point of the contact bubble is obtained, and the location information (X1, Y1) of the center point is used as the location information of the contact bubble, where X1 is the value of the center point in the X direction, and Y1 is the value of the center point in the Y direction.

In the contact application interface of a three-dimensional display interface, the touch screen may be divided into grids having an X direction, a Y direction, and a Z direction. All application icon information on the touch screen may be indicated by values in the X, Y, and Z directions. Likewise, a contact bubble with three-dimensional space information may also use values of (X1, Y1, Z1) to indicate location information of the contact bubble. The principle is the same as above and is not further described here.

In other embodiments, location information of a contact bubble on a touch screen may also be obtained in other modes. Embodiments of the present invention include but are not limited to the above implementation modes.

When a finger of a user touches the screen, a mobile phone can obtain a touch point of the user, that is, location information (X2, Y2) of a touch point specifically operated by the user. The mobile phone determines whether the location information matches location information of a certain contact bubble. The purpose of matching is to judge whether the operation of the user is to select a contact. Specifically, the matching method may be: calculating a distance between location information (X1, Y1) of a contact bubble and location information (X2, Y2) of a touch point. If the calculated result is smaller than a preset value, it is regarded that the matching succeeds, and a contact selection command is triggered. If the matching does not succeed, it is regarded that the touch point is an invalid touch point, and no operation command is triggered or a prompt command is triggered, where the prompt command is used to prompt the user that the touch point is an invalid touch point. A specific prompt command is displayed through a prompt interface of the touch screen, or a voice is output through an audio outputting device (such as a speaker).

In a contact application interface, when a user uses a finger to touch a contact on a screen, a mobile terminal may obtain an operation command of the user through a touch screen, for example, may obtain a contact opening command and a contact selection command of the user. In the prior art, a user clicks a contact on a screen quickly, and a mobile terminal obtains a contact opening command of the user; after obtaining the command, the mobile terminal sends a command to a contact application module, commanding the contact application module to open the contact; the user continues to touch a contact on the touch screen, and the mobile terminal may determine that the command is a contact selection command.

Figure 12:
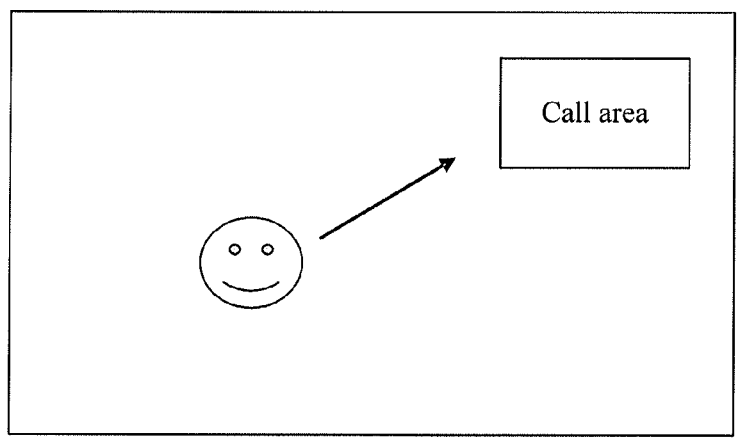
FIG. 12 is a first schematic diagram of a call display according to the Embodiment 7 of the present invention.

Step 707: Obtain the operation track of a user. The operation track may be the drag track of a contact bubble, as shown in FIG. 12.

Step 708: Move the selected contact bubble according to the operation track.

Step 709: Judge whether the contact bubble has an overlapping area with a preset call area; if the contact bubble has an overlapping area with the preset call area, execute step 710, or if the contact bubble has no overlapping area with the preset call area, execute step 711. The preset call area is a fixed area defaulted by a system or a fixed area defined after the setting of the user is accepted. As shown in FIG. 12, an area on the upper right corner of a touch screen is a call area, where the call area may be fixedly set at a fixed location, or may be in a floating or drifting state. The size of the call area on the touch screen may be a known fixed value according to the presetting. The location information of an edge area of the call area may also be obtained, and the location information of all points in the area may also be obtained. Actually, location information of the call area may be understood as the set of location information of all points in the area. In other embodiments, location information (X3, Y3) of the center point of the call area is obtained according to the known size of the call area, and the location information of the center point may be used as the location information of the call area.

There may be multiple methods for judging whether the contact bubble has an overlapping area with the preset call area:

Method 1: Judge whether location information of edge points of a contact bubble is location information of points in the call area. The edge points are points constituting the outer shape of a contact bubble, and the set of edge points forms the circle-like shape of the contact bubble, to constitute the display effect of a whole contact bubble. It is assumed that location information of any edge point a is $(x1, y1)$, and location information of the call area is understood as set A of location information of all points in the area and is assumed to be $[X, Y]$. In this case, if the mobile terminal determines that the location information of edge points of the contact bubble belongs to location information of points in the call area, namely, $(x1, y1) \in [X, Y]$, that is, the location information of edge points of the contact bubble is location information of points in the call area, the contact bubble has an overlapping area with the preset call area; as shown in the figure, and the edge point a of the contact bubble on the touch screen is also within the call area, that is, an overlapping area exists. If $(x1, y1) \notin [X, Y]$, that is, the location information of any edge point of the contact bubble is not within the call area, the contact bubble has no overlapping area with the call area.

Method 2: Judge whether a distance between the location information (X1, Y1) of the contact bubble and the location information (X3, Y3) of the call area is within a preset value. Assuming that the preset value is Q, the above judgment may be represented by the calculation formula $F(X,Y) = \sqrt{(X-X1)^2 + (Y-Y1)^2} - Q \leq 0$. If $F(X, Y) \leq 0$, that is, a distance between the location information of the contact bubble and the location information of the call area is within the preset value, that is, the contact bubble has an overlapping area with the call area. If $F(X, Y) > 0$, that is, a distance between the location information of the contact bubble and the location information of the call area is not within the preset value, that is, the contact bubble has no overlapping area with the call area. In the method, the location information of the call area is obtained in the following way: obtaining the location information (X3, Y3) of the center point of the call area according to the known size of the call area, and using the location information of the center point as the location information of the call area.

Figure 13:
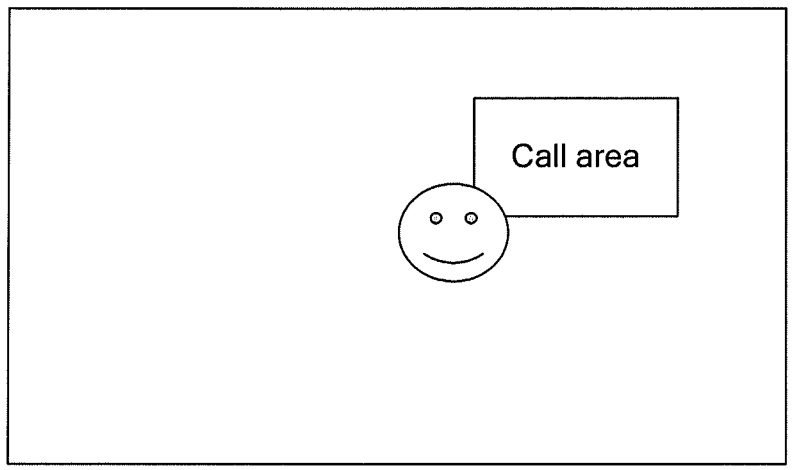
FIG. 13 is a second schematic diagram of a call display according to the Embodiment 7 of the present invention.

It is understandable that other methods may also be available for judging whether the contact bubble has an overlapping area with the preset call area; embodiments of the present invention include but are not limited to the foregoing two methods. In addition, the overlapping area may be part of the overlapping area or a whole overlapping area, which is not limited here. As shown in FIG. 13, the contact bubble has an overlapping area with the call area.

Figure 14:
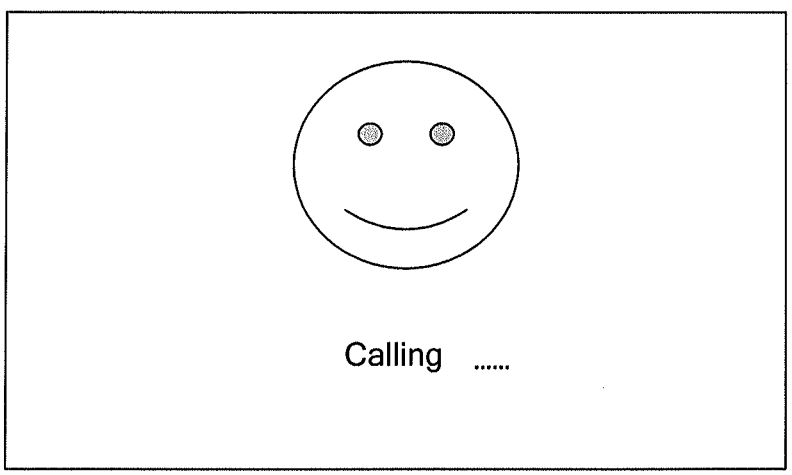
FIG. 14 is a third schematic diagram of a call display according to the Embodiment 7 of the present invention.

Step 710: Call the contact. As shown in FIG. 14, when the mobile terminal determines that the contact bubble has an overlapping area with the preset call area, the mobile terminal triggers a call command, and according to a call procedure in the prior art, calls a contact represented by the contact bubble.

Step 711: Terminate processing. When the mobile terminal determines that the contact bubble has no overlapping area with the preset call area, no processing is performed on the contact.

In this embodiment, the call area may be regarded as another contact bubble, and the location of the contact bubble on the touch screen may be fixed or dynamic. Therefore, "judging whether the contact bubble has an overlapping area with the preset call area" in this embodiment is judging whether a contact bubble selected by a user has an overlapping area with another contact bubble. In addition, two contact bubbles exist: selected contact bubble A and another contact bubble B; in this solution, contact bubble A is a mobile terminal user, that is, contact bubble A is created for the mobile terminal user to facilitate subsequent operations. Contact bubble B is a contact of the mobile terminal. In this case, when contact bubble A has an overlapping area with contact bubble B, a call command is triggered, and the mobile terminal initiates a call procedure to contact B. Or, in this solution, contact bubble B is a mobile terminal user, and contact bubble A is a contact of the mobile terminal. In this case, when the contact bubble A has an overlapping area with contact bubble B, a call command is triggered, and the mobile terminal initiates a call procedure to contact A. In conclusion, on a contact application interface, when a user drags a mobile terminal user with a contact bubble and the mobile terminal user has an overlapping area with other contact bubbles, or when the user drags other contact bubbles and the contact bubbles have overlapping areas with a mobile terminal user with a contact bubble, the call procedure is initiated. The specific implementation of this solution is the same as the method in the above embodiments and is not further described here.

In addition, in the embodiment of the present invention, if the user selects multiple contact bubbles in step 706, for example, selects three contacts by touching the touch screen with three fingers, and drags the three contacts to the call area, the call procedure can also be initiated. In this case, a mode of multiparty communication is formed.

In the above embodiment of the present invention, an operation command such as a command for sending a short message or sending an email may be executed in step 710.

In the embodiment of the present invention, the call processing of a contact can be completed by only moving fingers simply, which saves the time for a user to perform call operations, greatly improves the capability of intelligent interaction of a mobile terminal, and improves the user experience of the user.

Embodiment 8

Figure 15:
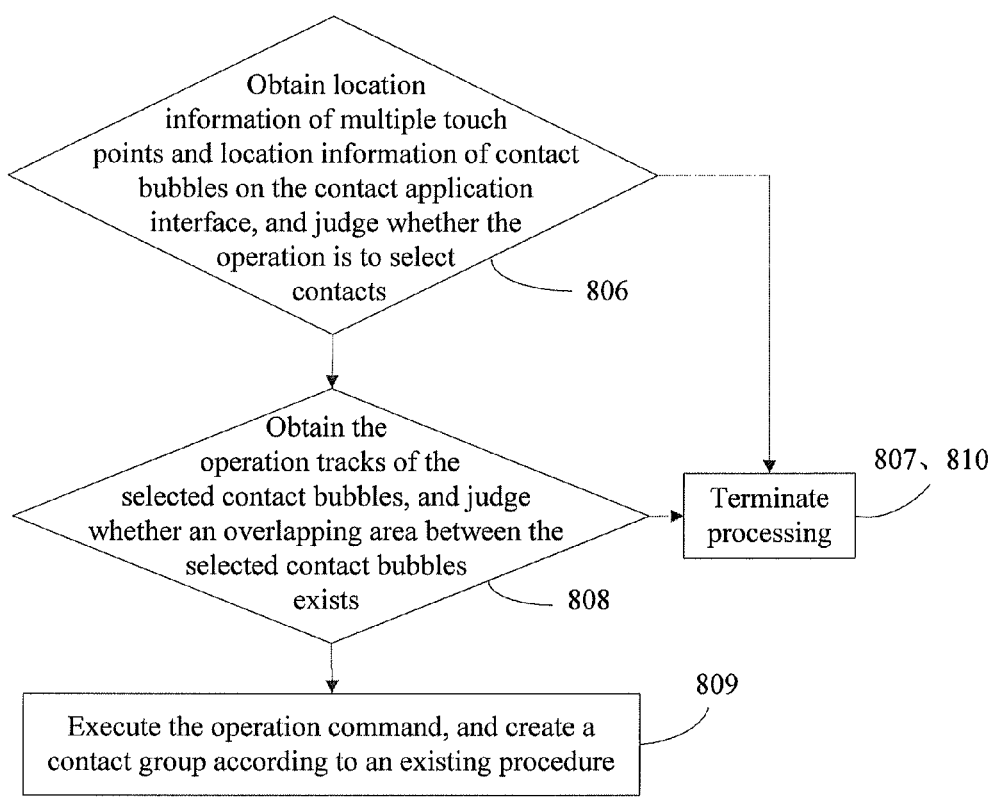
FIG. 15 is part of a flowchart of a method according to Embodiment 8 of the present invention.

In the prior art, modes for grouping contacts are as follows. Mode 1: obtaining a command of a user for creating a group, obtaining a command of the user for adding a contact on a newly created group interface, and adding at least one contact to a group; or mode 2: obtaining a command for selecting at least one contact, and adding the selected contact to a newly created group. In the prior art, operation steps of the mode for creating a contact group are too troublesome, causing operation time to be too long, which is unfavorable to the intelligent interaction between a mobile phone and a user. Therefore, an embodiment of the present invention provides a method for grouping on a contact application interface, and the method greatly simplifies the operation mode of creating a contact group. As shown in FIG. 15, the method specifically includes:

Step 801: Set a mapping relationship between different values of distinctive attributes of contacts and display effects of contact icons.

Step 802: Read contacts.

Step 803: Obtain distinctive attributes of contacts locally or from a network side.

Step 804: Determine the display effects of contact icons according to the mapping relationship and the distinctive attributes.

Step 805: Display the contacts distinctively according to the determined display effects.

The specific technical solution in the above steps is already detailed in the above embodiments and is not further described here.

Step 806: Obtain location information of multiple touch points and location information of a contact bubble on a contact application interface, and judge whether the operation is to select a contact. If the operation is to select a contact, execute step 808; if the operation is not to select a contact, execute step 807.

In the prior art, a multi-point touch technology may sense location information of multiple touch points on a touch screen, which is not further described here. In this step, the judging whether the operation is to select a contact may be specifically: matching location information of multiple touch points with location information of a contact bubble. Distances between location information $(x_1, y_1), (x_2, y_2), \ldots,$ and $(x_n, y_n)$ of contact bubbles and location information $(X_1, Y_1), (X_2, Y_2), \ldots,$ and $(X_m, Y_m)$ of touch points are calculated one by one; if the calculated result is within a preset value, it is regarded that the matching succeeds, and a contact selection command is triggered. If the matching does not succeed, it is regarded that a touch point is an invalid touch point, and no operation command is triggered or a prompt command is triggered, where the prompt command is used to prompt the user that the touch point is an invalid touch point. The specific prompt command is displayed through the prompt interface of the touch screen, or a voice is output through an audio outputting device (such as a speaker).

Step 807: Terminate processing.

Step 808: Obtain operation tracks of selected contact bubbles, and judge whether an overlapping area between the selected contact bubbles exists, and if an overlapping area exists, execute step 805, if no overlapping area exists, execute step 806. The method for judging whether an overlapping area between the selected contact bubbles exists in this step may be the judging method in the above embodiment and is not further described here.

Step 809: Execute an operation command, and create a contact group according to an existing procedure.

Step 810: Terminate processing.

Figure 16:
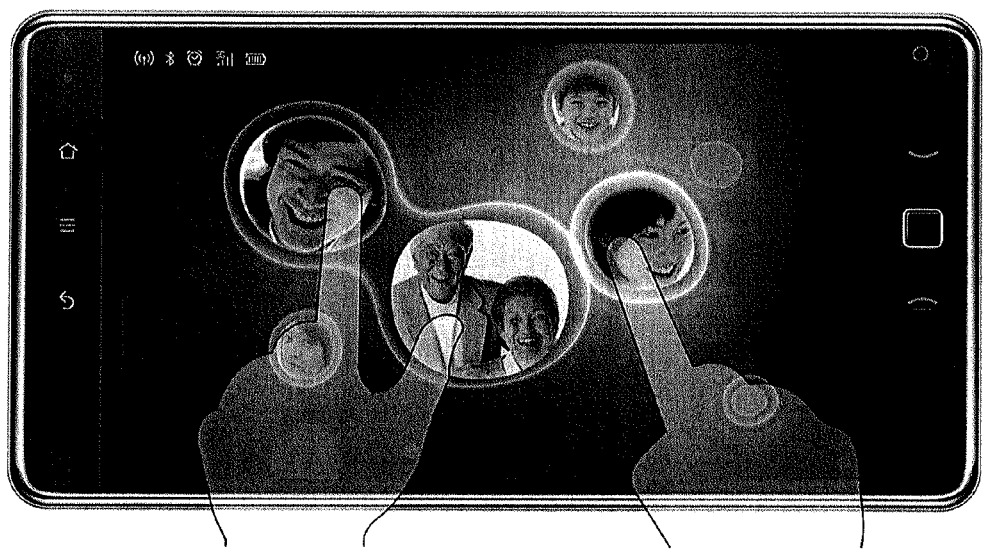
FIG. 16 is a display effect diagram of user operations according to the Embodiment 8 of the present invention.

The following describes a specific solution in the embodiment of the present invention in detail from the perspective of a mobile terminal user. As shown in FIG. 16, after a user opens a contact application interface, the user selects three contact bubbles (represented as contacts A, B, and C respectively) by touching with three fingers, and folds the three fingers to bring the three contacts together on a touch screen; a mobile terminal displays a dialog box, saying "Do you want to create a group for contacts A, B, and C?" Then the user selects yes or no at will.

The embodiment of the present invention solves the technical problem of too long operation time caused by the troublesome operation steps of the mode for creating a contact group, greatly simplifies the operation mode for creating a contact group, improves the capability of intelligent interaction between a mobile terminal and a user, and also improves the operation experience of the user.

Embodiment 9

Figure 17:
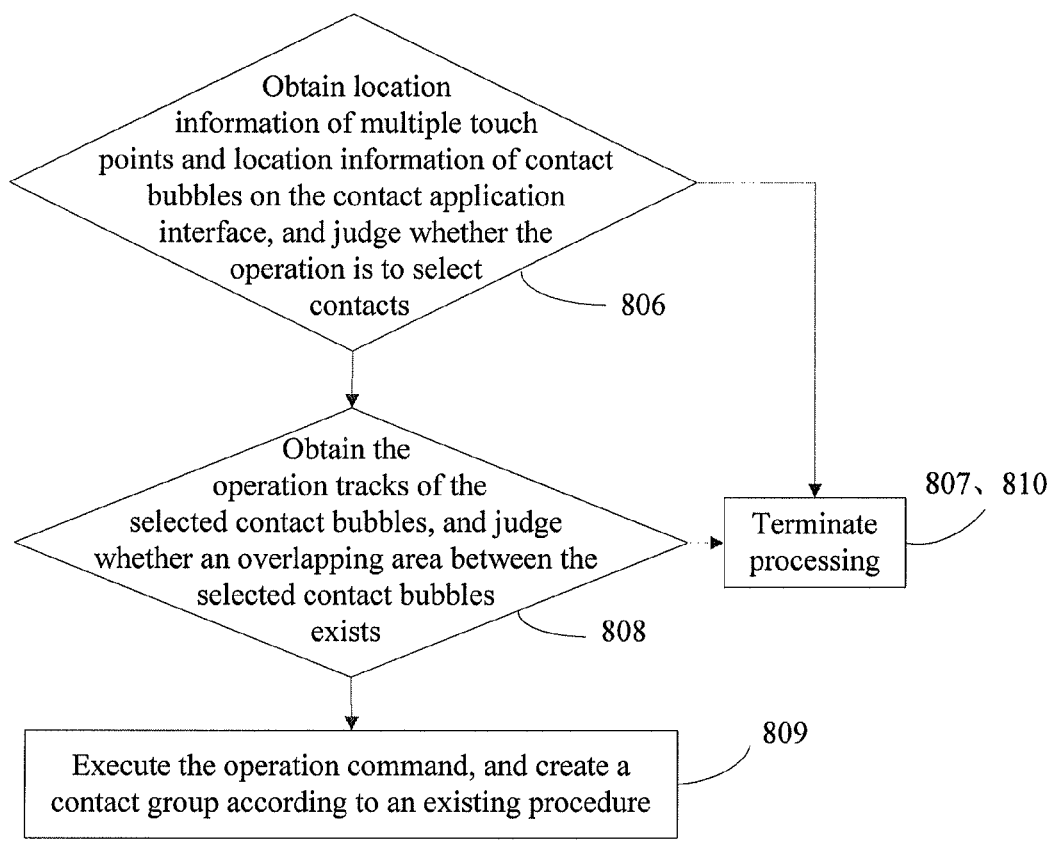
FIG. 17 is part of a flowchart of a method according to Embodiment 9 of the present invention.

The embodiment of the present invention further provides another method for creating a contact group on the contact application interface. As shown in FIG. 17, specifically, the method includes:

Step 901: Set a mapping relationship between different values of distinctive attributes of contacts and display effects of contact icons.

Step 902: Read contacts.

Step 903: Obtain distinctive attributes of contacts locally or from a network side.

Step 904: Determine the display effects of contact icons according to the mapping relationship and the distinctive attributes.

Step 905: Display the contacts distinctively according to the determined display effects.

The specific technical solution in the above steps is already detailed in the above embodiments and is not further described here.

Step 906: Obtain gesture information of a user on a touch screen, and judge whether the gesture information is an operation command for creating a contact group, and if the gesture information is the operation command for creating a contact group, execute step 907; if the gesture information is not the operation command for creating a contact group, execute step 910. Specifically, the gesture information is information about a certain area divided by the user on the touch screen, for example, the gesture information of the user is an enclosed area, an enclosed circle, or a rectangle; the mobile terminal may obtain the location information of the gesture information. For a specific calculation method for obtaining the location information, reference can be made to the method in the above embodiments and is not further described here.

The mobile terminal pre-stores a mapping relationship between the specific gesture information and the operation command for creating a contact group. Therefore, when the gesture information of the user complies with the mapping relationship, the mobile terminal obtains the operation command for creating a contact group.

Step 907: Obtain an operation command of the user for selecting a contact and the operation track of the user. The above embodiment already details the specific implementation about how to obtain the operation command of the user for selecting a contact and obtain the operation track of the user, and therefore detailed description is not provided here.

Step 908: Judge whether location information of a selected contact bubble is within the area divided by the gesture information, and if the location information of the selected contact bubble is within the area divided by the gesture information, execute step 909; if the location information of the selected contact bubble is not within the area divided by the gesture information, execute step 910. The method for judging whether the location information of the selected contact bubble is within the area divided by the gesture information is the same as the specific method in the above embodiments, and is not further described here.

Step 909: Execute a command for adding a contact to a contact group.

Step 910: Do not execute the operation of adding a contact.

Figure 18:
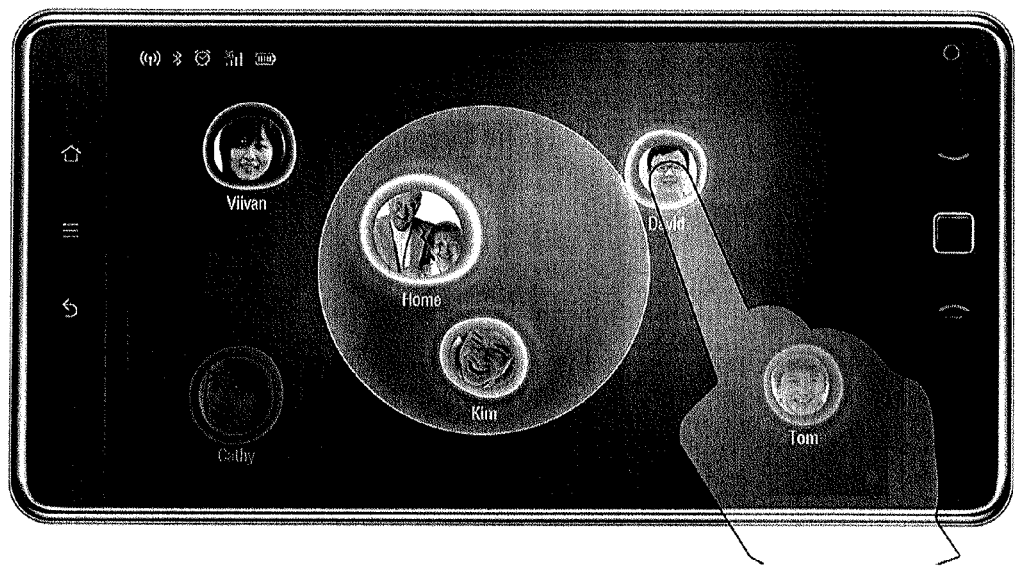
FIG. 18 is a display effect diagram of a method according to the Embodiment 9 of the present invention.

The following describes, from the perspective of a user operation, how to create a climber group, to describe a specific solution in the embodiment of the present invention. For example, a mobile terminal user opens a contact application interface in the embodiment of the present invention, and wants to create a contact group named "climber clan". The user divides a circular area on a touch screen first, and a mobile terminal identifies that the gesture information is gesture information of creating a contact group, and prompts the user to enter the name of the contact group on the touch screen. After entering the name "climber clan" of the contact group, the user may touch a contact bubble on the touch screen with a finger to select a contact and drag the contact bubble to the circular area, to complete the operation of adding a contact to the contact group "climber clan". If the user wants to continue adding another contact to the contact group, the user may select another contact bubble and drag the contact bubble to the circular area, then add the contact to the group. Definitely, multiple contact bubbles may also be selected and dragged to a circular bubble simultaneously, so that the multiple contacts are added to the group at a time. FIG. 18 is a display effect diagram of user operations according to an embodiment of the present invention.

It is understandable that the user may also not enter the contact group name but directly select a contact bubble and drag it to the circular area. If the user presets a contact attribute for each contact, the mobile terminal may generate a group name according to the attribute. Contact attributes are some contact tags set by the user, and various characters of non-null values entered by the user may be used as contact attributes. For example, the user already adds a contact attribute colleague or Facebook for the contact when the user creates a contact bubble; therefore, when a contact group is created according to the embodiment of the present invention, the mobile terminal automatically generates a group name with a common contact attribute according to the contact attribute that all contacts dragged to the circular area have or a group attribute. For example, if contacts A, B, and C dragged by the user to the circular area all have a contact attribute family, the contact group is automatically defined as "family"; if contacts A, B, and C dragged by the user to the circular area all have a contact attribute Facebook, the contact group is automatically defined as "Facebook". In other embodiments, if contacts A, B, and C dragged by the user to the circular area all have a contact attribute family, and contacts D and E both have a contact attribute Facebook, the mobile terminal may automatically divide the five contacts into two contact groups: One group is named "family", and includes the following contacts: A, B, and C; another group is named "Facebook", and includes the following contacts: D and E.

The operation of the method for creating a contact group according to the embodiment of the present invention is simple, and greatly improves the capability of intelligent interaction between a mobile terminal and a user, shortens operation time, and also improves the use experience of the user.

Embodiment 10

Figure 19:
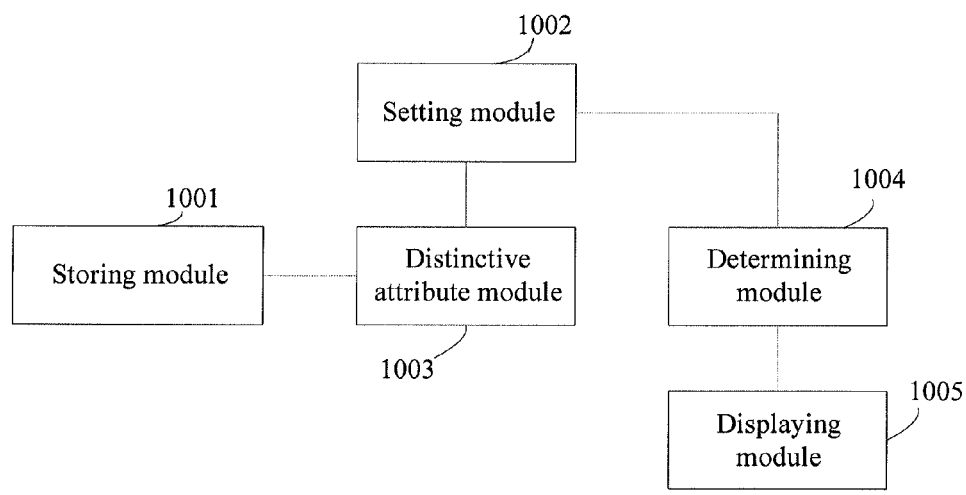
FIG. 19 is a first schematic diagram of a contact processing apparatus according to Embodiment 10 of the present invention.

An embodiment of the present invention also provides a mobile terminal. As shown in FIG. 19, the mobile terminal specifically includes a radio frequency transceiving antenna, a communication module, and a central processing unit, and the mobile terminal further includes a contact processing apparatus, where the contact processing apparatus specifically includes:

a storing module 1001, configured to store contacts;

a setting module 1002, configured to set a mapping relationship between different values of distinctive attributes of contacts and display effects of contact icons;

a distinctive attribute module 1003, configured to obtain distinctive attributes of contacts;

a determining module 1004, configured to determine display effects of contact icons according to the mapping relationship; and a displaying module 1005, configured to display the contacts distinctively according to the determined display effects.

Further, a distinctive attribute include a group attribute, where the group attribute is contact group information set by a user for a contact; the distinctive attribute module is specifically configured to obtain the group attribute of a contact; the setting module is specifically configured to set a mapping relationship between different values of group attributes of contacts and display effects of contact icons.

Further, a distinctive attribute includes a contact attribute, where the contact attribute is times of communication between a mobile terminal user and a contact in a preset time; the distinctive attribute module is specifically configured to obtain a contact attribute of a contact; the setting module is specifically configured to set different mapping relationships between different values of contact attributes of contacts and display effects of contact icons.

Further, a distinctive attribute includes a location attribute; the distinctive attribute module is specifically configured to obtain a location attribute of a contact; the setting module is specifically configured to set a mapping relationship between different values of location attributes of contacts and display effects of contact icons.

Figure 20:
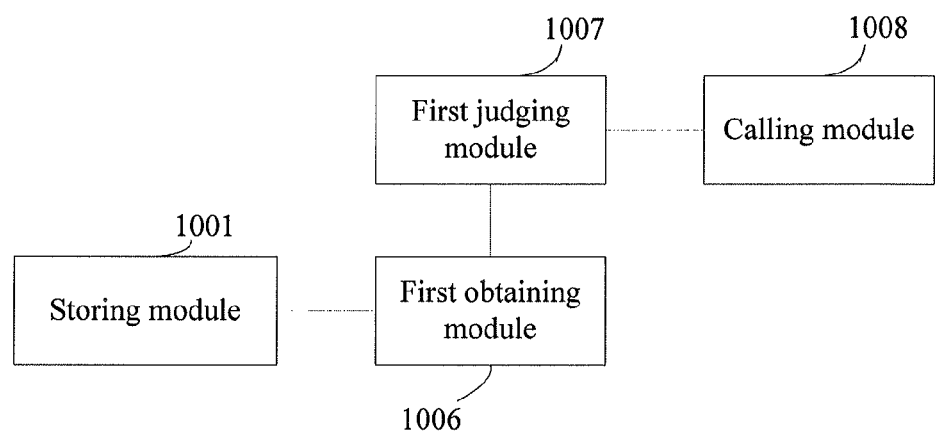
FIG. 20 is a second schematic diagram of the contact processing apparatus according to the Embodiment 10 of the present invention.

Further, as shown in FIG. 20, the contact processing apparatus may include:

a first obtaining module 1006, configured to obtain an operation track of a user for a contact in the storing module 1001;

a first judging module 1007, configured to judge whether the contact has an overlapping area with a preset call area; and a calling module 1008, configured to call the contact when the judging module determines that the contact has an overlapping area with the preset call area.

Figure 21:
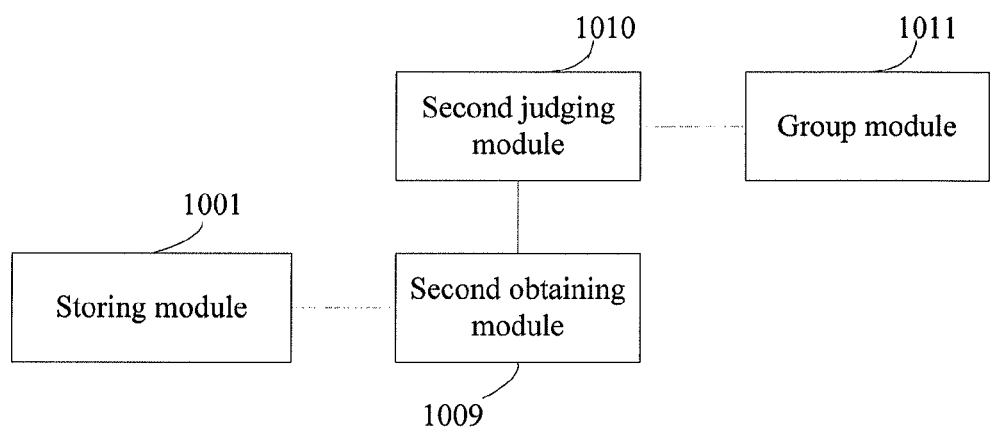
FIG. 21 is a third schematic diagram of the contact processing apparatus according to the Embodiment 10 of the present invention.

Further, as shown in FIG. 21, the contact processing apparatus may include:

a second obtaining module 1009, configured to obtain an operation command for selecting contacts, and obtain operation tracks of the selected contacts;

a second judging module 1010, configured to judge whether an overlapping area between the selected contacts exists; and a group module 1011, configured to execute creation of a contact group when the second judging module determines that an overlapping area between the selected contacts exists.

Further, the contact processing apparatus may include:

a third obtaining module, configure to obtain gesture information of a user on a touch screen;

a third judging module, configured to judge whether the gesture information is an operation command for creating a contact group;

the third obtaining module, further configured to obtain the operation command of the user for selecting contacts when the third judging module determines that the gesture information is the operation command for creating a contact group;

the third judging module, further configured to judge whether location information of the selected contacts is within an area divided by the gesture information; and a group module, configured to add the contacts to the contact group when the third judging module determines that the location information of the selected contacts is within the area divided by the gesture information.

It is understandable that the description in the above method embodiments is also applicable to the embodiment of the mobile terminal. In addition, in the embodiment of the apparatus, the contact processing apparatus may be integrated in the central processing unit of the mobile terminal to become part of the central processing unit.

The mobile terminal in the above embodiment may be a terminal device such as a mobile phone having a touch screen, a tablet computer, a PDA (personal digital assistant), a home information display (Home information Display, HID), and a mobile Internet device (Mobile Internet Device, HID). It is understandable that if the touch screen size of the mobile terminal is bigger and the material of the touch screen is better, the performance of the processing unit is better, and the display effects of displaying contacts distinctively on the contact application interface in the above embodiment are better. A mobile phone having a touch screen of more than 3.5 inches is recommended in the embodiment of the present invention; definitely, the same effect may also be reached by using an existing tablet computer.

In the case that the mobile terminal is a mobile phone, the mobile phone further includes: a radio frequency circuit, a microphone, a speaker, and a power supply to implement the basic functions of the mobile phone. The following describes the radio frequency circuit, microphone, speaker, and power supply:

The radio frequency circuit is mainly configured to set up communication between a mobile phone and a radio network, and implement data receiving and sending between the mobile phone and the radio network.

The microphone is configured to collect a voice and convert the collected voice into voice data, so that the mobile phone sends the voice data to the radio network through the radio frequency circuit.

The speaker is configured to restore voice data received by the mobile phone from the radio network through the radio frequency circuit to a voice and play the voice to a user.

The power supply is mainly configured to supply power for each circuit or component of the mobile phone to ensure the normal work of the mobile phone.

Persons of ordinary skill in the art may understand that all or part of processes in the methods of the above embodiments may be implemented by relevant hardware instructed by a computer program. The program may be stored in a computer readable storage medium, and when the program is executed, may include the processes of the above method embodiments. The storage medium may be a magnetic disk, a CD-ROM, a read-only memory (Read-Only Memory, ROM), or a random access memory (Random Access Memory, RAM).

The above description is only about exemplary embodiments of the present invention, and the present invention is not limited thereto. Any modifications, substitutions, and improvements made without departing from the spirit and the principle of the present invention shall fall within the protection scope of the present invention.

What is claimed is:

1. A method for processing contacts in a mobile terminal having a processor, performed by the processor, comprising:
    setting a mapping relationship between values of a group attribute of contacts and display effects of contact bubbles corresponding to the contacts, wherein the values of the group attribute indicate contact group information set for the contacts, respectively;
    reading the contacts, and obtaining the values of the group attribute of contacts locally or from a network device;
    determining the display effects of contact bubbles according to the mapping relationship and the values of the group attribute; and
    displaying the contacts distinctively according to the determined display effects.

2. The method according to claim 1, further comprising:
    obtaining a contact selection command of a user of the mobile terminal, and determining at least one of the contact bubbles;
    obtaining an operation track of the user;
    moving the at least one contact bubble according to the operation track;
    determining that the at least one contact bubble overlaps a preset call area; and
    calling the contact corresponding to the at least one contact bubble after the determination.

3. The method according to claim 2, wherein determining that the at least one contact bubble overlaps a preset call area comprises:
    determining that the at least one contact bubble overlaps the preset call area when location information of an edge point of the at least one contact bubble is location information of a point within the preset call area; or
    determining that the at least one contact bubble overlaps the preset call area when a distance between location information of the at least one contact bubble and location information of the preset call area is within a preset value, wherein the location information is physical location data on a touch screen of the mobile terminal.

4. The method according to claim 1, further comprising:
    obtaining location information of multiple touch points on a contact application interface and location information of the contact bubbles;
    determining whether the location information of the touch points falls into the contact bubbles, and after determining that the location information of the touch points falls into the contact bubbles, selecting the contact bubbles that the touch points fall into, and obtaining operation tracks of the selected contact bubbles; and
    determining whether an overlapping area exists between the selected contact bubbles, and after determining that an overlapping area exists between the selected contact bubbles, executing an operation command for creating a contact group.

5. The method according to claim 1, further comprising:
    obtaining gesture information of a user on a touch screen, and judging whether the gesture information is an operation command for creating a contact group;
    after determining that the gesture information is the operation command for creating a contact group, obtaining an operation command of the user for selecting contacts;
    obtaining an operation track of the user; and
    determining whether location information of the selected contact bubbles is within an area divided by the gesture information, and after determining that the location information of the selected contact bubbles is within the area divided by the gesture information, adding contacts represented by the contact bubbles to the contact group.

6. The method according to claim 5, wherein the judging whether the gesture information is the operation command for creating a contact group comprises:
    pre-storing a mapping relationship between the gesture information and the operation command for creating a contact group; and
    determining, according to the obtained gesture information and the mapping relationship, whether the operation is to create a contact group.

7. A mobile terminal, comprising a radio frequency transceiving antenna, a communication module, a central processing unit, and a contact processing apparatus comprising:
    a storing module, configured to store contacts;
    a setting module, configured to set a mapping relationship between values of a group attribute of the contacts and display effects of contact bubbles corresponding to the contacts, wherein the values of the group attribute indicate contact group information set for the contacts, respectively;
    a distinctive attribute module, configured to obtain the values of the group attribute of the contacts;
    a determining module, configured to determine the display effects of contact bubbles according to the mapping relationship; and
    a displaying module, configured to display the contacts distinctively according to the determined display effects.

8. The mobile terminal according to claim 7, wherein the contact processing apparatus further comprises:
    a first obtaining module, configured to obtain an operation track a contact bubble among the contact bubbles;
    a first determining module, configured to determine whether the contact bubble corresponding to the contact overlaps a preset call area; and
    a calling module, configured to call the contact when the determining module determines that the contact bubble corresponding to the contact overlaps the preset call area.

9. The mobile terminal according to claim 7, wherein the contact processing apparatus further comprises:
    a second obtaining module, configured to obtain an operation command for selecting multiple contact bubbles among the contact bubbles, and obtain operation tracks of the multiple contact bubbles;
    a second determining module, configured to determine whether an overlapping area of the multiple contact bubbles exists; and
    a group module, configured to create a contact group for the multiple contact bubbles when the second determining module determines that the overlapping area of the multiple contact bubbles exists.

10. The mobile terminal according to claim 7, wherein the contact processing apparatus further comprises:
- a third obtaining module, configure to obtain gesture information on a touch screen of the mobile terminal; and
- a third determining module, configured to determine whether the gesture information is an operation command for creating a contact group;
- wherein the third obtaining module is further configured to obtain an operation command for selecting a contact bubble of the contact bubbles when the third determining module determines that the gesture information is the operation command for creating a contact group;
- wherein the third determining module is further configured to determine whether location information of the selected contact bubble is within an area specified by the gesture information;
- wherein the contact processing apparatus further comprises a group module configured to add the selected contact bubble to the contact group when the third determining module determines that the location information of the selected contact bubble is within the area specified by the gesture information.

* * * * *